(12) United States Patent
Wu (10) Patent No.: US 8,861,961 B2
(45) Date of Patent: Oct. 14, 2014

(54) PASSIVE OPTICAL NETWORK, ACCESS METHOD THEREOF, OPTICAL NETWORK UNIT AND OPTICAL LINE TERMINATION

(75) Inventor: Guangdong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 13/107,117

(22) Filed: May 13, 2011

(65) Prior Publication Data

US 2011/0280578 A1 Nov. 17, 2011

(30) Foreign Application Priority Data

May 14, 2010 (CN) .......................... 2010 1 0176192

(51) Int. Cl.
*H04J 14/00* (2006.01)
*H04J 3/06* (2006.01)

(52) U.S. Cl.
CPC ...... *H04J 3/0682* (2013.01); *H04Q 2213/1301* (2013.01)
USPC .............................................. 398/67; 398/66

(58) Field of Classification Search
CPC .................. H04Q 11/0067; H04Q 2011/0079; H04Q 2011/0064; H04Q 2011/0088; H04Q 2011/0081; H04B 10/272; H04B 10/27; H04B 10/032; H04B 10/69; H04B 10/03; H04B 10/11; H04B 10/801; H04J 14/0282; H04J 14/0246; H04J 14/025; H04J 3/1694; H04J 14/0227; H04J 14/02; H04J 3/0682; H04J 14/0252; H04J 14/0247; H04J 14/0256; H04J 14/00; H04J 14/0204; H04J 14/0216
USPC ............... 398/162, 165–170, 58–72
See application file for complete search history.

(56) References Cited

U.S. PATENT DOCUMENTS

| | | | | |
|---|---|---|---|---|
| 5,930,018 A | * | 7/1999 | Effenberger | .................. 398/161 |
| 7,301,970 B2 | * | 11/2007 | Kim et al. | ..................... 370/535 |

(Continued)

FOREIGN PATENT DOCUMENTS

| | | | |
|---|---|---|---|
| CN | 101026474 | | 8/2007 |
| CN | 101114910 A | * | 1/2008 |

(Continued)

OTHER PUBLICATIONS

Official English Translation WO2009087761.*

(Continued)

*Primary Examiner* — Ken Vandperpuye
*Assistant Examiner* — Dibson Sanchez
(74) *Attorney, Agent, or Firm* — Staas & Halsey LLP (57) ABSTRACT

A method for accessing a Passive Optical Network (PON) is disclosed. The method includes: obtaining a first distance parameter of an Optical Network Unit (ONU), where the first distance parameter indicates the location of the ONU relative to an Optical Line Termination (OLT); receiving an ONU information request message delivered by the OLT, and returning an ONU information response message to the OLT when a second distance parameter carried in the ONU information request message corresponds to the first distance parameter; and receiving a ranging request message, where the ranging request message is delivered by the OLT according to the ONU information response message, returning a ranging response message as a basis for the OLT to obtain an Equalization Delay (EQD) value of the ONU, and connecting the ONU to the PON according to the EQD value. An ONU, an OLT, and a PON are also disclosed. The embodiments of the present invention enable the ONUs located at different distances from a same PON port to access the PON in lossless mode, thereby making full use of port resources and ensuring efficient running of devices.

3 Claims, 5 Drawing Sheets

(56) References Cited

U.S. PATENT DOCUMENTS

| | | | |
|---|---|---|---|
| 7,382,739 B2* | 6/2008 | Kramer | 370/254 |
| 7,403,490 B2* | 7/2008 | Lim et al. | 370/254 |
| 7,489,869 B2* | 2/2009 | Kazawa et al. | 398/71 |
| 8,045,857 B2* | 10/2011 | Nomura et al. | 398/66 |
| 8,145,055 B2* | 3/2012 | Niibe et al. | 398/25 |
| 8,249,458 B2* | 8/2012 | Mizutani et al. | 398/100 |
| 8,493,982 B2* | 7/2013 | Borges et al. | 370/395.51 |
| 2002/0196801 A1* | 12/2002 | Haran et al. | 370/432 |
| 2003/0177215 A1* | 9/2003 | Sutherland et al. | 709/223 |
| 2005/0008158 A1* | 1/2005 | Huh et al. | 380/256 |
| 2005/0047782 A1* | 3/2005 | Davis et al. | 398/58 |
| 2006/0159049 A1* | 7/2006 | Chung | 370/331 |
| 2006/0256811 A1* | 11/2006 | Saito et al. | 370/465 |
| 2007/0133800 A1* | 6/2007 | Kim et al. | 380/256 |
| 2007/0172236 A1* | 7/2007 | Nomura et al. | 398/45 |
| 2007/0189771 A1* | 8/2007 | Kim | 398/69 |
| 2007/0274720 A1* | 11/2007 | Menasco et al. | 398/66 |
| 2008/0040604 A1* | 2/2008 | Kim et al. | 713/168 |
| 2008/0317469 A1* | 12/2008 | Kazawa et al. | 398/71 |
| 2009/0010642 A1* | 1/2009 | Sui et al. | 398/9 |
| 2009/0010650 A1* | 1/2009 | Tsuchiya et al. | 398/59 |
| 2009/0052894 A1* | 2/2009 | Murata | 398/43 |
| 2009/0067850 A1* | 3/2009 | Mizutani et al. | 398/154 |
| 2009/0238558 A1* | 9/2009 | Katayama et al. | 398/16 |
| 2009/0245790 A1* | 10/2009 | Mizutani et al. | 398/43 |
| 2009/0263132 A1* | 10/2009 | Rafel et al. | 398/66 |
| 2010/0040371 A1* | 2/2010 | Wu et al. | 398/58 |
| 2010/0074628 A1* | 3/2010 | Murakami et al. | 398/182 |
| 2010/0183316 A1* | 7/2010 | Gordon et al. | 398/149 |
| 2010/0290784 A1* | 11/2010 | Mukai et al. | 398/66 |
| 2011/0123193 A1* | 5/2011 | Yamanaka et al. | 398/45 |
| 2011/0142444 A1* | 6/2011 | Borges et al. | 398/25 |

FOREIGN PATENT DOCUMENTS

| | | |
|---|---|---|
| CN | 101582734 | 11/2009 |
| WO | WO 2006/003164 A1 | 1/2006 |
| WO | WO 2009087761 A1 * | 7/2009 |
| WO | WO 2010013393 A1 * | 2/2010 |

OTHER PUBLICATIONS

Chinese First Office Action mailed Jul. 3, 2012, issued in related Chinese Application No. 201010176192.3 (8 pages).

* cited by examiner

PASSIVE OPTICAL NETWORK, ACCESS METHOD THEREOF, OPTICAL NETWORK UNIT AND OPTICAL LINE TERMINATION

CROSS-REFERENCE TO RELATED APPLICATION

This application claims priority to Chinese Patent Application No. 201010176192.3, filed on May 14, 2010, which is hereby incorporated by reference in its entirety.

FIELD OF THE INVENTION

The present invention relates to communications technologies, and in particular, to a Passive Optical Network (PON) and an access method thereof, an Optical Network Unit (ONU), and an Optical Line Termination (OLT).

BACKGROUND OF THE INVENTION

As a point-to-multipoint fiber access technology, a PON is composed of an OLT at the central office, an ONU at the customer premises, and an Optical Distribution Network (ODN). A PON system may be: Gigabit Passive Optical Network (GPON, namely, 2.5 Gbps PON), 10-Gigabit Passive Optical Network (XG-PON, namely, 10 Gbps PON), Ethernet Passive Optical Network (EPON), ATM Passive Optical Network (APON), or Broadband Passive Optical Network (BPON).

In a PON system, because the transmission distance of fibers is up to scores of kilometers or even over a hundred kilometers, the distance from a PON port to ONUs under this PON port varies sharply. To prevent deterioration of services, communication protocols generally restrict the distance difference between ONUs under the same PON port. For example, in a GPON system, the protocols specify that the upper threshold of the distance difference between ONUs under the same PON port is 20 km.

In the process of implementing the present invention, the inventor finds at least the following defects in the prior art:

The application scope of the PON is wider; in specific application environments, the distance difference between ONUs under the same PON port is restricted so that the operator has to provide independent PON ports for users located at different distances, which brings an adverse effect on reasonable use of port resources; moreover, inefficient running of devices leads to a high cost of maintenance and hinders energy saving and emission reduction.

SUMMARY OF THE INVENTION

An embodiment of the present invention provides a method for accessing a PON to make full use of port resources and ensure efficient running of devices. The method includes:

obtaining a first distance parameter of an ONU, where the first distance parameter indicates a location of the ONU relative to an OLT;

receiving an ONU information request message delivered by the OLT, and returning an ONU information response message to the OLT when a second distance parameter carried in the ONU information request message corresponds to the first distance parameter; and receiving a ranging request message, where the ranging request message is delivered by the OLT according to the ONU information response message, returning a ranging response message as a basis for the OLT to obtain an Equalization Delay (EQD) value of the ONU, and connecting the ONU to the PON according to the EQD value.

An embodiment of the present invention provides another method for accessing a PON to make full use of port resources and ensure efficient running of devices. The method includes:

delivering an ONU information request message to an ONU;

receiving an ONU information response message, where the ONU information response message is returned by the ONU when a first distance parameter of the ONU corresponds to a second distance parameter carried in the ONU information request message, and the first distance parameter indicates a location of the ONU relative to an OLT;

delivering a ranging request message to the ONU according to the ONU information response message;

receiving a ranging response message returned by the ONU, and obtaining an EQD value of the ONU according to the ranging response message; and connecting the ONU to the PON according to the EQD value.

An embodiment of the present invention provides an ONU to make full use of port resources and ensure efficient running of devices. The ONU includes:

an obtaining module, configured to obtain a first distance parameter of the ONU, where the first distance parameter indicates a distance between the ONU and an OLT;

a first receiving and responding module, configured to receive an ONU information request message delivered by the OLT, and return an ONU information response message to the OLT when the first distance parameter corresponds to a second distance parameter carried in the ONU information request message;

a second receiving and responding module, configured to receive a ranging request message, where the ranging request message is delivered by the OLT according to the ONU information response message, and return a ranging response message as a basis for the OLT to obtain an EQD value of the ONU; and an accessing module, configured to connect the ONU to a PON according to the EQD value.

An embodiment of the present invention provides an OLT is provided to make full use of port resources and ensure efficient running of devices. The OLT includes:

a first delivering module, configured to deliver an ONU information request message to an ONU;

a first receiving module, configured to receive an ONU information response message, where the ONU information response message is returned by the ONU when a first distance parameter of the ONU corresponds to a second distance parameter carried in the ONU information request message, and the first distance parameter indicates a location of the ONU relative to the OLT;

a second delivering module, configured to deliver a ranging request message to the ONU according to the ONU information response message;

a second receiving module, configured to receive a ranging response message returned by the ONU, and obtain an EQD value of the ONU according to the ranging response message; and an accessing module, configured to connect the ONU to a PON according to the EQD value.

An embodiment of the present invention provides a PON is provided to make full use of port resources and ensure efficient running of devices. The PON includes:

an ONU, configured to obtain a first distance parameter of the ONU, where the first distance parameter indicates a location of the ONU relative to an OLT; receive an ONU information request message delivered by the OLT, and return an ONU information response message to the OLT when the first distance parameter corresponds to a second distance parameter carried in the ONU information request message; receive a ranging request message, where the ranging request message is delivered by the OLT according to the ONU information response message, and return a ranging response message to the OLT; and the OLT, configured to deliver an ONU information request message to the ONU; receive an ONU information response message returned by the ONU; deliver a ranging request message to the ONU according to the ONU information response message; receive a ranging response message returned by the ONU, and obtain an EQD value of the ONU according to the ranging response message; and connect the ONU to the PON according to the EQD value.

In the embodiments of the present invention, the ONU obtains a first distance parameter of the ONU, where the first distance parameter indicates a location of the ONU relative to an OLT; receives an ONU information request message delivered by the OLT, and returns an ONU information response message to the OLT when the first distance parameter corresponds to a second distance parameter carried in the ONU information request message; receives a ranging request message, where the ranging request message is delivered by the OLT according to the ONU information response message, and returns a ranging response message as a basis for the OLT to obtain an EQD value of the ONU; and accesses the PON according to the EQD value. Unlike the prior art which restricts the distance difference between ONUs under the same PON port, the embodiments of the present invention enable ONUs at different distances under the same PON port to access the PON in lossless mode without restricting the distance difference between different ONUs under the same PON port, thereby making full use of port resources, ensuring efficient running of devices, reducing the maintenance cost, and facilitating energy saving and emission reduction.

In the embodiments of the present invention, the OLT delivers an ONU information request message to the ONU; receives an ONU information response message, where the ONU information response message is returned by the ONU when the first distance parameter of the ONU corresponds to a second distance parameter carried in the ONU information request message, and the first distance parameter indicates the location of the ONU relative to the OLT; delivers a ranging request message to the ONU according to the ONU information response message; receives a ranging response message returned by the ONU, and obtains an EQD value of the ONU according to the ranging response message; and connects the ONU to the PON according to the EQD value. Unlike the prior art which restricts the distance difference between ONUs under the same PON port, the embodiments of the present invention enable ONUs at different distances under the same PON port to access the PON in lossless mode without restricting the distance difference between different ONUs under the same PON port, thereby making full use of port resources, ensuring efficient running of devices, reducing the maintenance cost, and facilitating energy saving and emission reduction.

BRIEF DESCRIPTION OF THE DRAWINGS

To make the technical solution under the present invention clearer, the following describes the accompanying drawings involved in the description of the embodiments of the present invention. Apparently, the accompanying drawings described below are illustrative and not exhaustive, and persons of ordinary skill in the art can derive other drawings from such accompanying drawings without any creative effort.

DETAILED DESCRIPTION OF THE EMBODIMENTS

To make the objectives and merits of the technical solution under the present invention clearer, the following describes the embodiments of the present invention in more detail with reference to the accompanying drawings. The exemplary embodiments of the present invention and the description thereof are illustrative in nature, and shall not be construed as limitations to the present invention.

Figure 1:
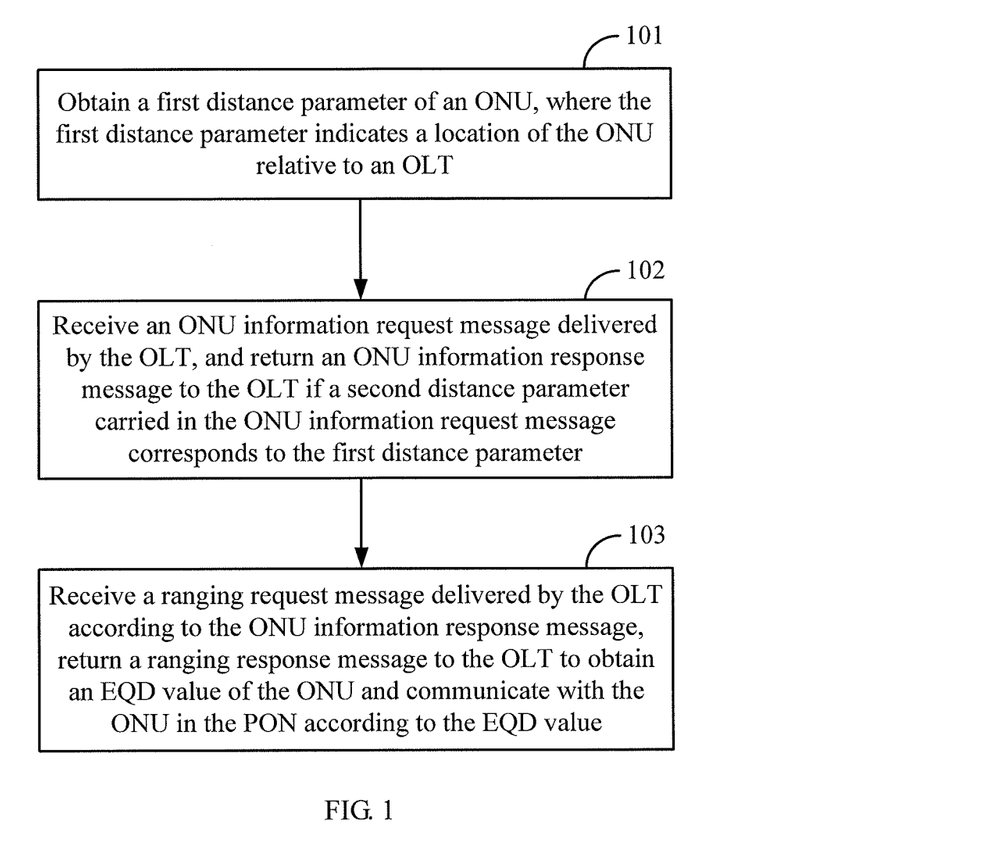
FIG. 1 is a flowchart of a method for accessing a PON in an embodiment of the present invention.

In the prior art, a distance difference between different ONUs communicating with the same PON port is restricted. When the distance difference between different ONUs communicating with the same PON port exceeds a specified threshold, it is impossible to ensure lossless access of all ONUs under the same PON port, and therefore an operator needs to provide independent PON ports for ONUs at difference distances. To prevent such a problem, the present invention discloses a method for accessing a PON to achieve lossless access without restricting the distance difference between ONUs under the same PON port. As shown in FIG. 1, the method may include the following steps:

Step 101: Obtain a first distance parameter, where the first distance parameter indicates a location of the ONU relative to an OLT.

The first distance parameter is set according to the distance between the ONU and the OLT. A value of the first distance parameter could be a specific distance value, or a parameter value corresponding to the distance value.

The first distance parameter may be input manually according to the location of the ONU in the process of constructing the network; or the OLT sets the first distance parameter according to the response to a conversation between the ONU and OLT.

Step 102: Receive an ONU information request message delivered by the OLT, and return an ONU information response message to the OLT when the first distance parameter corresponds to a second distance parameter carried in the ONU information request message. In this embodiment, the second distance parameter corresponds to the first distance parameter if the second distance parameter and the first distance parameter comprise the same distance value, or other parameters indicating the location relation between the ONU and the OLT, or parameters that are recorded in a mapping table and related to each other in a preset mapping relation.

Step 103: Receive a ranging request message, where the ranging request message is delivered by the OLT according to the ONU information response message, and return a ranging response message to the OLT. The OLT would obtain an EQD value of the ONU according to the ranging response message, and communicates with the ONU in the PON according to the EQD value.

For example, one OLT may communicate with multiple ONUs. The management scope of the OLT is 60 km around the OLT. The multiple ONUs are distributed at different distances from the OLT, and the distances fall into several distance intervals less than 60 km, for example, 0-20 km, 20-40 km, and 40-60 km. Distance parameters are set for indicating the distance intervals respectively. In an operation process, a first distance parameter is stored in an ONU for indicating that the ONU is distributed at a distance interval corresponding to the first distance parameter. When the OLT sends an ONU information request message, which carries a second distance parameter therein, to the ONU. The second distance parameter records different location information to indicate a target distance interval of the ONU information request message. The ONU judges whether the second distance parameter corresponds to the first distance parameter, and, if so, responds the ONU information request message to the OLT, and obtains the EQD value from the OLT. The ONU information request message may be a request for obtaining the serial number of the ONU, or other requests for obtaining ONU information. Specifically, the second distance parameter corresponds to the first distance parameter if the second distance parameter and the first distance parameter are the same distance value, or other parameters indicating the location relation between the ONU and the OLT, or parameters that are recorded in a mapping table and related to each other in a preset mapping relation.

Specifically, the OLT obtains the identifier of a specific ONU which is distributed in a "current ranging area" according to the ONU information response message; the OLT delivers a ranging request message to the specific ONU according to the identifier; the ONU receives the ranging request message delivered by the OLT, and returns a ranging response message to allow the OLT to send an EQD value of the ONU. The EQD value is a delay adjustment value assigned by the OLT to the ONU to compensate for processing delay of different ONUs and prevent collision of uplink transmitted data. The ONU communicates with the OLT according to the EQD value in the PON, which means that the ONU can correctly receive the assigned bandwidth value delivered by the OLT and can correctly communicate with the OLT with respect to configurations and services. It is understandable that EQD values of the ONUs located in different distance intervals vary. For example, the EQD value of the ONU located are a distance interval farthest away from the OLT may be the smallest, for example, as small as 0; and the EQD value increases gradually for other ONUs. Therefore, the ONUs located at different distance intervals can communicate with the OLT in different opportunities. A proper distance interval may be selected for the ONU with the smallest EQD value as required.

The procedure shown in FIG. 1 is implemented by an ONU. Evidently, in this embodiment, the ONU obtains the first distance parameter, where the first distance parameter corresponds to the location information of the ONU relative to the OLT; receives an ONU information request message delivered by the OLT, and returns an ONU information response message to the OLT when the first distance parameter corresponds to a second distance parameter carried in the ONU information request message; receives a ranging request message, where the ranging request message is delivered by the OLT according to the ONU information response message, and returns a ranging response message as a basis for the OLT to obtain an EQD value of the ONU; and accesses the PON according to the EQD value. Unlike the prior art which restricts the distance difference between ONUs under the same PON port, this embodiment enables ONUs at different distances under the same PON port to access the PON in lossless mode without restricting the distance difference between different ONUs under the same PON port, thereby making full use of port resources, ensuring efficient running of devices, reducing the maintenance cost, and facilitating energy saving and emission reduction.

Figure 2:
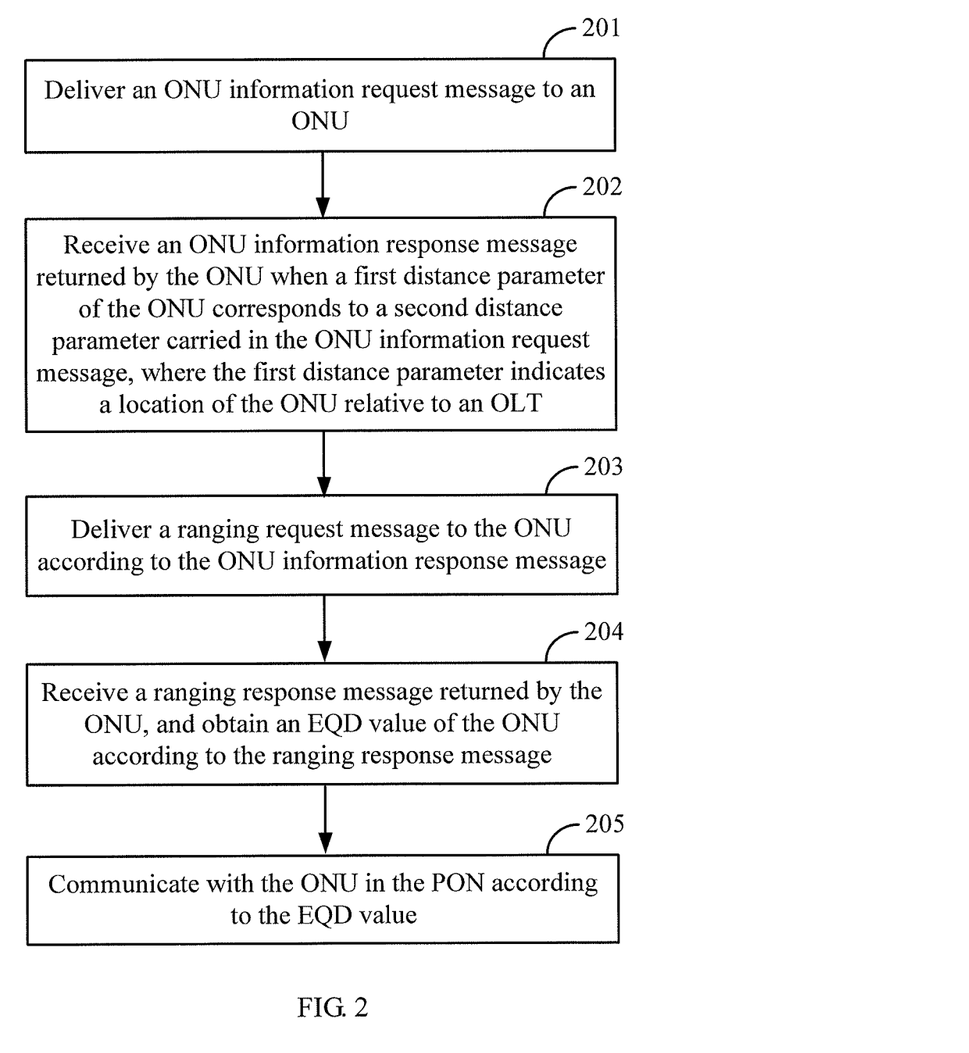
FIG. 2 is a flowchart of another method for accessing a PON in an embodiment of the present invention.

FIG. 2 is a flowchart of another method for accessing a PON in an embodiment of the present invention. The method may include the following steps:

Step 201: Deliver an ONU information request message to an ONU. The ONU information request message may be a request for obtaining the serial number of the ONU, or other requests for obtaining ONU information.

Step 202: Receive an ONU information response message, where the ONU information response message is returned by the ONU when a first distance parameter of the ONU corresponds to a second distance parameter carried in the ONU information request message. The first distance parameter could be set according to the location of the ONU relative to an OLT. In some embodiments, the first distance parameter could be set according to a location interval of the ONU relative to the OLT. In some other embodiments, the first distance parameter may also be the distance information from the ONU to the OLT. The second distance parameter is set for indicating the current communication area of the OLT, and when the ONU finds itself configured in the communication area indicated by the second distance parameter, an ONU information response message is sent to the OLT by the ONU.

Step 203: Deliver a ranging request message to the ONU according to the ONU information response message. When the OLT receives the ONU information response message, which means that the ONU which sends the response message is configured in the current ranging area, the ranging request message is sent to the ONU accordingly.

Step 204: Receive a ranging response message returned by the ONU, and obtain an EQD value of the ONU according to the ranging response message.

Step 205: Communicate with the ONU in the PON according to the EQD value.

The procedure shown in FIG. 2 is implemented by the OLT. Evidently, in this embodiment, the OLT delivers an ONU information request message to the ONU; receives an ONU information response message, where the ONU information response message is returned by the ONU when the first distance parameter of the ONU corresponds to a second distance parameter carried in the ONU information request message, and the first distance parameter indicates the location of the ONU relative to the OLT; delivers a ranging request message to the ONU according to the ONU information response message; receives a ranging response message returned by the ONU, and obtains an EQD value of the ONU according to the ranging response message; and communicates with ONU in the PON according to the EQD value. Unlike the prior art which restricts the distance difference between ONUs under the same PON port, the embodiments of the present invention enable ONUs at different distances under the same PON port to access the PON in lossless mode without restricting the distance difference between different ONUs under the same PON port, thereby making full use of port resources, ensuring efficient running of devices, reducing the maintenance cost, and facilitating energy saving and emission reduction.

Specifically, the ONU obtains a first distance parameter of the ONU, where the first distance parameter indicates the location of the ONU relative to the OLT; the OLT delivers an ONU information request message to the ONU; after receiving the ONU information request message, the ONU judges whether the second distance parameter carried in the ONU information request message corresponds to the first distance parameter, and returns an ONU information response message to the OLT if the second distance parameter corresponds to the first distance parameter; after receiving the ONU information response message, the OLT delivers a ranging request message to the ONU according to the ONU information response message; the ONU returns a ranging response message to the OLT, and the OLT obtains an EQD value of the ONU according to the ranging response message, and connects the ONU to the PON according to the EQD value.

In practice, the ONU may obtain the first distance parameter in many modes. For example, the ONU may obtain information about the location of the ONU relative to the OLT according to the local configuration information, and set the first distance parameter corresponding to the location information. In the practical setting, a calculation formula may be preset, and the first distance parameter may be calculated according to the calculation formula and the obtained location information.

In some embodiments, the location information may be a specific distance value. A first distance parameter may be used for indicating a distance interval away from the OLT. That means, the ONU configured in a distance interval may store a same first distance parameter therein. For example, the first distance parameter of the ONUs that are 20 km, 22 km, and 32 km away from the OLT is set to a same corresponding value, and the first distance parameter of the ONU that is 40 km away from the OLT is set to another corresponding value. The foregoing distance range may also be a distance interval at which the ONU is located. A specific value of the first distance parameter is set for each distance interval. For example, the first distance parameter of the ONUs that are 20-30 km away from the OLT is set to one corresponding value, and the first distance parameter of the ONUs that are 30-40 km away from the OLT is set to another corresponding value. The span of the distance interval may be set as required. For example, the maximum distance supported by the OLT is determined first, and then the number of distance intervals is determined according to the rule of dividing the distance range into distance intervals. Finally, the span of each distance interval is determined. The distance intervals may have the same span or different spans. Generally, the span of a distance interval is 20 km, and may be 10 km, 30 km, or another value.

Because the first distance parameter and the location of the ONU relative to the OLT are in a mapping relation, the first distance parameter of the ONU is more suitable than the distance between the ONU and the OLT for reflecting the flexibility of access processing of the ONU. When the ONU accesses the PON, the first distance parameter is set to different values flexibly in view of the distance between the ONU and the OLT. In this way, all ONUs in a specified range under the same PON port can access the PON smoothly without restricting the distance difference between the ONUs under the port or affecting the services of other ONUs under the port.

The ONU may obtain the information about the location of the ONU relative to the OLT according to the local configuration information in many modes. For example, the ONU may set the location of the ONU relative to the OLT through hardware control such as through a key, a Dual In-line Package (DIP) switch, or a jumper, or through software control.

In another embodiment, the ONU may obtain the first distance parameter in this way: The ONU receives a specific request message delivered by the OLT and returns a specific response message to the OLT; and receives a first distance parameter delivered by the OLT, where the first distance parameter is set by the OLT according to the information about the location of the ONU relative to the OLT, and the location information is obtained by the OLT according to the specific response message.

In this embodiment, the first distance parameter of the ONU is set by the OLT. The OLT delivers a specific request message to the ONU first, and obtains the information about the location of the ONU relative to the OLT according to the specific response message received from the ONU; sets the first distance parameter corresponding to the location information, and delivers the first distance parameter to the ONU.

In practice, the specific request message may be an ONU information request message, or another request message sent by the OLT to obtain the information about the location of the ONU relative to the OLT. The specific request message is sent by the OLT to the specified ONU, and may be sent according to the identifier, model, type, or serial number of the ONU, or any combination thereof. After receiving the specific response message returned by the ONU, the OLT knows the location of the ONU relative to the OLT, and then sets the first distance parameter.

As described above, when the OLT sets the first distance parameter of the ONU, the information about the location of the ONU relative to the OLT may also be a specific distance value. At the time of setting the first distance parameter, one or more distance values may be set as a corresponding value. Alternatively, the location information is a distance interval corresponding to the ONU. A specific value of the first distance parameter is set for each distance interval.

For example, the OLT may send a specific request message to the ONUs in different distance intervals periodically. Therefore, this embodiment enables all ONUs located at any specified distance to access the PON in lossless mode by setting the first distance parameter that supports different distances for the ONUs in different distance intervals. Taking 0-60 km as an example, the OLT sends a specific request message to the ONUs in different distance intervals periodically. In different distance intervals, the first distance parameter that supports different distances is set for the ONUs located at different distances; the first distance parameter that supports 40 km is set for the ONUs located at a distance of 0-20 km; the first distance parameter that supports 20 km is set for the ONUs located at a distance of 20-40 km; and the first distance parameter that supports 0 km is set for the ONUs located at a distance of 40-60 km.

This embodiment is compatible with the ONU activation procedure specified in the XPON protocol.

In practice, the ONU receives an ONU information request message delivered by the OLT, judges whether the second distance parameter carried in the ONU information request message corresponds to the first distance parameter, and returns an ONU information response message to the OLT if the second distance parameter corresponds to the first distance parameter. That is, the ONU responds to the ONU information request message corresponding to the second distance parameter appropriately according to the first distance parameter.

The OLT performs ranging according to the ONU information response message returned by the ONU, namely, delivers a ranging request message to the ONU, receives a ranging response message from the ONU, and obtains the distance of the ONU through the ranging. The ranging result is processed, and an EQD value of the ONU is obtained by performing calculation according to a formula.

After obtaining the EQD value of the ONU according to the ranging response message, the OLT can communicate with ONU in the PON according to the EQD value. Different EQD values are delivered for different ONUs in different distance interval. The ONUs under the same PON port comply with a corporate start point for data transmission, namely, the ONUs are delayed to the same circumference relative to the OLT. After the EQD value is set, the procedure for connecting the ONU to the PON is activated.

The following description about the method disclosed herein takes the distance of 60 km as an example, but it is understandable that the embodiments of the present invention support the distance longer than 60 km.

Assuming that the distance is 0-60 km, the OLT sends an ONU information request message to the ONU periodically or irregularly. The ONU information request messages delivered by the OLT successively carry a second distance parameter whose EQD value is 0 km, 20 km, and 40 km respectively. In this way, the ONUs that are located at 40-60 km, 20-40 km, and 0-20 km and have the first distance parameter respond to the ONU information request message within two frames in a quiet window, so as to enable the OLT to correctly receive the ONU information response message from the ONUs within different distance intervals. The OLT performs ranging for each ONU according to the ONU information response message from this ONU, and obtains an EQD value of each ONU. The OLT performs the ONU activation procedures for the ONUs located at different distances respectively, and connects all ONUs under the PON port to the PON system smoothly.

This embodiment lifts the restriction imposed by the PON port onto the distance difference between the ONUs, and allows the ONUs whose distance difference is longer than 20 km to access the same PON port concurrently, thereby making full use of the PON port resources, reducing the maintenance cost of the operator, and reducing carbon emission. Moreover, the concurrent activation of the ONUs whose distance difference is longer than 20 km under the same PON port does not affect the existing services.

Persons of ordinary skill in the art should understand that all or part of the steps of the method specified in any embodiment above may be implemented by a program instructing relevant hardware. The program may be stored in a computer readable storage medium such as a Read Only Memory (ROM), a Random Access Memory (RAM), a magnetic disk or a Compact Disk Read-Only Memory (CD-ROM). When the program runs, the program performs all or part of the steps in the foregoing method embodiments.

Further, an ONU, an OLT, and a PON are disclosed, as described in the foregoing embodiments. The method of implementing such devices is similar to the method of accessing the PON. Therefore, the devices may be implemented with reference to the method embodiments above.

Figure 3:
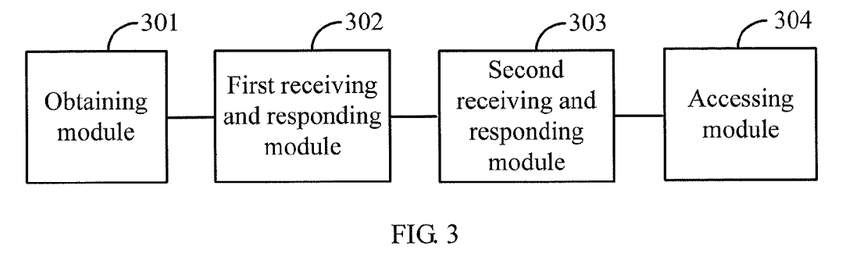
FIG. 3 shows a structure of an ONU in an embodiment of the present invention.

As shown in FIG. 3, an ONU provided in an embodiment of the present invention may include:

an obtaining module 301, configured to obtain a first distance parameter of the ONU, where the first distance parameter indicates the distance between the ONU and an OLT;

a first receiving and responding module 302, configured to receive an ONU information request message delivered by the OLT, and return an ONU information response message to the OLT when the first distance parameter corresponds to a second distance parameter carried in the ONU information request message;

a second receiving and responding module 303, configured to receive a ranging request message, where the ranging request message is delivered by the OLT according to the ONU information response message, and return a ranging response message as a basis for the OLT to obtain an EQD value of the ONU; and an accessing module 304, configured to connect the ONU to a PON according to the EQD value.

Figure 4:
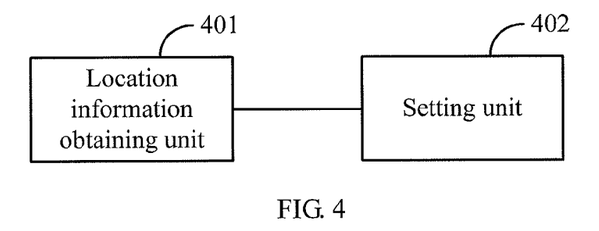
FIG. 4 shows a structure of an obtaining module in an embodiment of the present invention.

As shown in FIG. 4, the obtaining module 301 in an embodiment of the present invention may include:

a location information obtaining unit 401, configured to obtain information about the location of the ONU relative to the OLT according to local configuration information of the ONU; and a setting unit 402, configured to set the first distance parameter corresponding to the location information.

The setting unit 402 in an embodiment of the present invention may be configured to:

set the information about the location of the ONU relative to the OLT through a key, a DIP switch or a jumper according to the local configuration information of the ONU.

Figure 5:
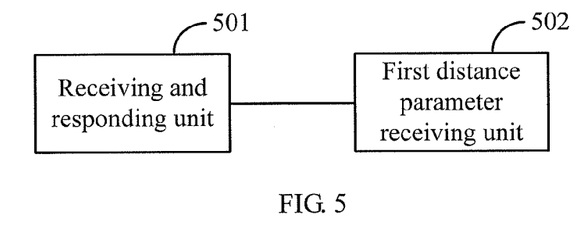
FIG. 5 shows another structure of an obtaining module in an embodiment of the present invention.

As shown in FIG. 5, the obtaining module 301 in an embodiment of the present invention may include:

a receiving and responding unit 501, configured to receive a specific request message delivered by the OLT and return a specific response message to the OLT; and a first distance parameter receiving unit 502, configured to receive the first distance parameter delivered by the OLT, where the first distance parameter is set by the OLT according to the information about the location of the ONU relative to the OLT, and the location information is obtained by the OLT according to the specific response message.

Figure 6:
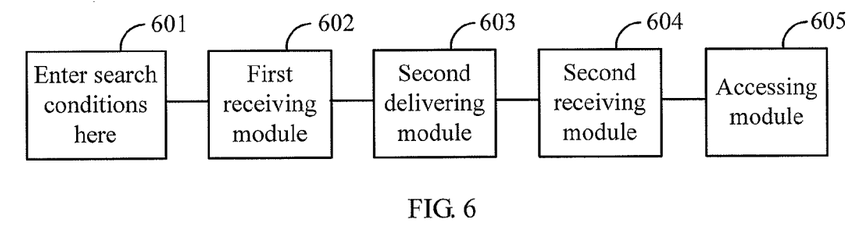
FIG. 6 shows a structure of an OLT in an embodiment of the present invention.

As shown in FIG. 6, an OLT provided in an embodiment of the present invention may include:

a first delivering module 601, configured to deliver an ONU information request message to an ONU;

a first receiving module 602, configured to receive an ONU information response message, where the ONU information response message is returned by the ONU when a first distance parameter of the ONU corresponds to a second distance parameter carried in the ONU information request message, and the first distance parameter indicates a location of the ONU relative to the OLT;

a second delivering module 603, configured to deliver a ranging request message to the ONU according to the ONU information response message;

a second receiving module 604, configured to receive a ranging response message returned by the ONU, and obtain an EQD value of the ONU according to the ranging response message; and an accessing module 605, configured to connect the ONU to a PON according to the EQD value.

Figure 7:
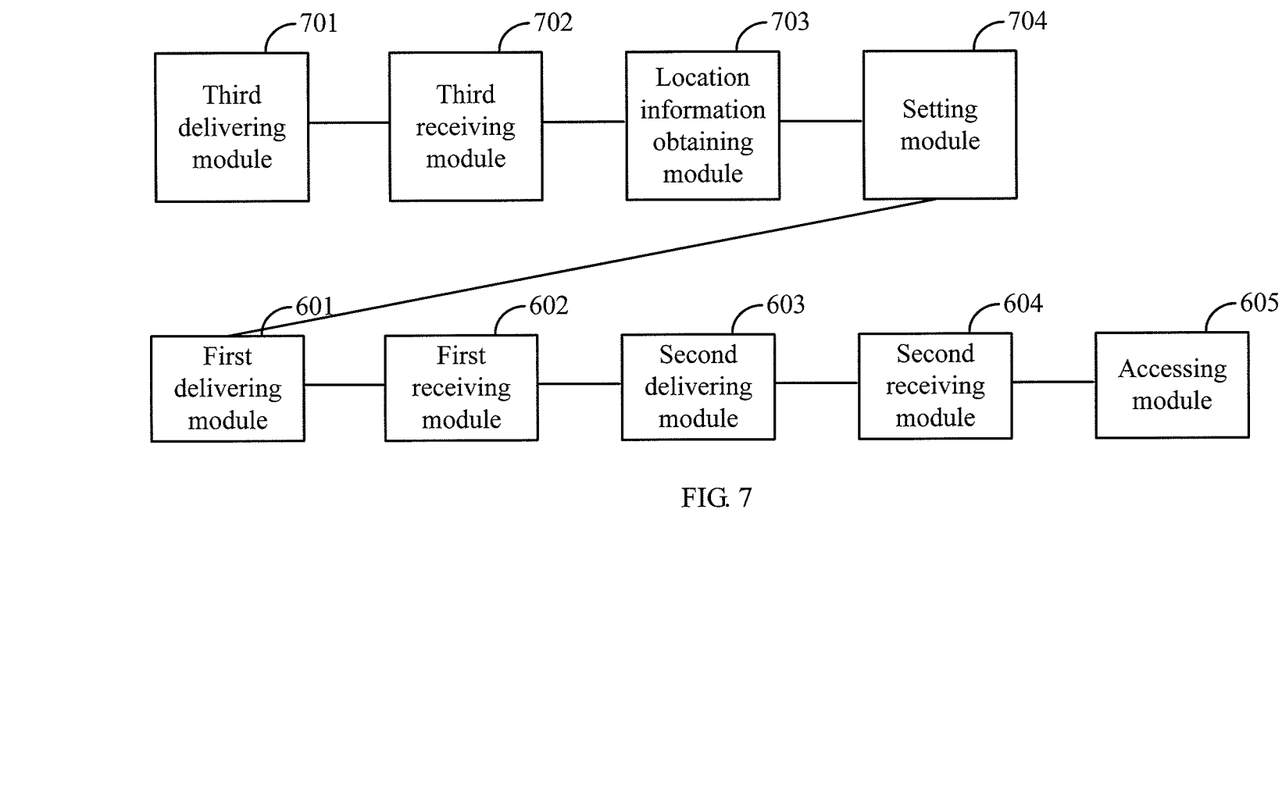
FIG. 7 shows a structure of an OLT in another embodiment of the present invention.

As shown in FIG. 7, an OLT provided in an embodiment of the present invention may further include:

a third delivering module 701, configured to deliver a specific request message to the ONU before the first delivering module delivers the ONU information request message to the ONU;

a third receiving module 702, configured to receive a specific response message returned by the ONU;

a location information obtaining module 703, configured to obtain information about the location of the ONU relative to the OLT according to the specific response message; and a setting module 704, configured to set the first distance parameter corresponding to the location information and deliver the first distance parameter to the ONU.

The third delivering module 701 in an embodiment of the present invention is configured to:

deliver a specific request message to the ONU according to the identifier, model, type, or serial number of the ONU, or any combination thereof.

Figure 8:
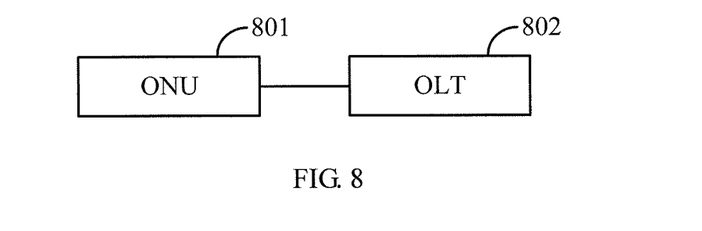
FIG. 8 shows a structure of a PON in an embodiment of the present invention.

As shown in FIG. 8, a PON provided in an embodiment of the present invention may include:

an ONU 801, configured to obtain a first distance parameter of the ONU, where the first distance parameter indicates a location of the ONU relative to an OLT; receive an ONU information request message delivered by the OLT, and return an ONU information response message to the OLT when the first distance parameter corresponds to a second distance parameter carried in the ONU information request message; receive a ranging request message, where the ranging request message is delivered by the OLT according to the ONU information response message, and return a ranging response message to the OLT; and an OLT 802, configured to deliver an ONU information request message to the ONU; receive an ONU information response message returned by the ONU; deliver a ranging request message to the ONU according to the ONU information response message; receive a ranging response message returned by the ONU, and obtain an EQD value of the ONU according to the ranging response message; and connect the ONU to the PON according to the EQD value.

It can be known that: in this embodiment, the ONU obtains the first distance parameter of the ONU, where the first distance parameter indicates the location of the ONU relative to the OLT; receives an ONU information request message delivered by the OLT, and returns an ONU information response message to the OLT when the first distance parameter corresponds to a second distance parameter carried in the ONU information request message; receives a ranging request message, where the ranging request message is delivered by the OLT according to the ONU information response message, and returns a ranging response message as a basis for the OLT to obtain an EQD value of the ONU; and accesses the PON according to the EQD value. Unlike the prior art which restricts the distance difference between ONUs under the same PON port, this embodiment enables ONUs at different distances under the same PON port to access the PON in lossless mode without restricting the distance difference between different ONUs under the same PON port, thereby making full use of port resources, ensuring efficient running of devices, reducing the maintenance cost, and facilitating energy saving and emission reduction.

In this embodiment, the OLT delivers an ONU information request message to the ONU; receives an ONU information response message, where the ONU information response message is returned by the ONU when the first distance parameter of the ONU corresponds to a second distance parameter carried in the ONU information request message, and the first distance parameter indicates the location of the ONU relative to the OLT; delivers a ranging request message to the ONU according to the ONU information response message; receives a ranging response message returned by the ONU, and obtains an EQD value of the ONU according to the ranging response message; and connects the ONU to the PON according to the EQD value. Unlike the prior art which restricts the distance difference between ONUs under the same PON port, the embodiments of the present invention enable ONUs at different distances under the same PON port to access the PON in lossless mode without restricting the distance difference between different ONUs under the same PON port, thereby making full use of port resources, ensuring efficient running of devices, reducing the maintenance cost, and facilitating energy saving and emission reduction.

This embodiment supports activation of ONUs at any distances from the PON port, without being restricted by the distance difference between ONUs. The embodiments of the present invention may become important specifications of a product to enhance competitiveness of the product in the market. The products supported in the embodiments of the present invention enable the ONUs located at a longer distance from a single PON port to access the PON, cover users in a wider range, save costs of purchase and maintenance for the operator, and reduce carbon emission.

Described above are the objectives, technical solution and benefits of the embodiments of the present invention. Although the invention has been described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for helping Optical Network Units (ONUs) access a Passive Optical Network (PON), comprising:
   sending, by an Optical Line Termination (OLT) of the PON, a same Optical Network Unit (ONU) information request message to the ONUs to thereby broadcast the ONU information request message to the ONUs, wherein the ONUs are located in different distance intervals from the OLT, the ONU information request message carrying a distance parameter indicating which interval is a target interval among the distance intervals;
   receiving, by the OLT, ONU information response messages from ONUs which are located in the target interval, in response to the sent ONU information request message;
   sending, by the OLT, ranging request messages to the ONUs located in the target interval according to the received ONU information response messages;
   receiving, by the OLT, ranging response messages returned by the ONUs located in the target interval, and obtaining Equalization Delay (EQD) values of the ONUs located in the target interval, according to the sent ranging response messages; and
   communicating, by the OLT, with the ONUs located in the target interval according to the EQD values.

2. An Optical Line Termination (OLT), comprising:
   a first delivering module, configured to deliver a same Optical Network Unit (ONU) information request message to ONUs to thereby broadcast the ONU information request message to the ONUs, wherein the ONUs are located in different distance intervals from the OLT, the ONU information request message carrying a distance parameter indicating which interval is a target interval among the distance intervals;
   a first receiving module, configured to receive ONU information response messages from ONUs which are located in the target interval, in response to the delivered ONU information request message;
   a second delivering module, configured to deliver a ranging request message to the ONUs located in the target interval according to the received ONU information response messages;
   a second receiving module, configured to receive ranging response messages returned by the ONUs located in the target interval, and obtain Equalization Delay (EQD)

values of the ONUs located in the target interval, according to the delivered ranging response messages; and
an accessing module, configured to connect the ONUs in the distance interval to the PON according to the EQD values.

3. A Passive Optical Network (PON), comprising an Optical Line Termination (OLT), and a plurality of Optical Network Units (ONUs) respectively configured in different distance intervals from the OLT, wherein the OLT comprises:
  a first delivering module, configured to deliver a same ONU information request message to the ONUs and thereby broadcast the ONU information request message to the ONUs, the ONU information request message comprises a distance parameter indicating which interval is a target interval among the distance intervals, so that each of the ONUs located in the target interval returns an ONU information response message to the OLT after receiving the ONU information request message;
  a second delivering module, configured to, when an ONU information response message is received by the OLT from one of the ONUs, deliver a ranging request message to said one of the ONUs;
  a receive module, configured to receive a response message to the ranging request message from said one of the ONUs, and obtain an Equalization Delay (EQD) value of said one of the ONUs, according to the received response message; and
  an accessing module, configured to communicate with said one of the ONUs according to the EQD.

* * * * *